United States Patent [19]

Merriman et al.

[11] Patent Number: 4,901,189

[45] Date of Patent: Feb. 13, 1990

[54] TERMINAL BLOCK AND METHODS OF MAKING

[75] Inventors: Glenn A. Merriman, Omaha; Michael E. Szymanski, Elkhorn, both of Nebr.

[73] Assignee: American Telephone and Telegraph Company, AT&T Technologies, Inc., Berkeley Heights, N.J.

[21] Appl. No.: 211,302

[22] Filed: Jun. 24, 1988

[51] Int. Cl.[4] .............................................. H02H 9/04

[52] U.S. Cl. .................................... 361/119; 361/426; 439/722; 439/276; 29/855; 29/883

[58] Field of Search ................ 379/412; 361/119, 129, 361/130, 426, 427, 392; 439/276, 736, 722, 723; 29/848, 855, 858, 883

[56] References Cited

U.S. PATENT DOCUMENTS

| | | | |
|---|---|---|---|
| 2,777,094 | 1/1957 | Weisberg | 361/119 |
| 3,345,542 | 10/1967 | Paddock et al. | 361/392 |
| 3,374,536 | 3/1968 | Schroeder et al. | 29/613 |
| 3,389,461 | 6/1968 | Hardardt | 29/848 |
| 4,033,663 | 7/1977 | McCardel | 439/545 |
| 4,700,995 | 10/1987 | Kupferschmidt et al. | 439/276 |
| 4,734,061 | 3/1988 | Randall, Jr. et al. | 439/709 |

*Primary Examiner*—A. D. Pellinen
*Assistant Examiner*—H. L. Williams
*Attorney, Agent, or Firm*—Edward W. Somers

[57] ABSTRACT

A terminal block (20) includes a plurality of wells each having a protector (32) disposed therein and each having a bore which communicates with a U-shaped terminal (60) so that a portion of the protector extends through the bore into engagement with a bade (66) of the terminal. Tangs (68—68) of each terminal depend downwardly. Also, the terminal block includes a plurality of terminal posts (62—62) each having a spade (69) depending therefrom. A first plastic material (70) encapsulates the base and innermost portions of each U-shaped terminal and post. Individual conductors of a pair in a cable (50) extend to a depending tang of a terminal and to a tang of an associated terminal. A strap wire interconnects the other depending tang of each U-shaped terminal to a spade of an associated terminal post. A second plastic material encapsulates the wiring and the outermost portions of the U-shaped terminals and of the spades of the terminal posts. In making this terminal block, the use of a two step plastic encapsulation process allows the terminals and terminal posts to be held in position with wiring exposed during electrical tests. If the test results are acceptable, the remaining portions of the U-shaped terminals and terminal posts are encapsulated with the second plastic material. If the test results are not acceptable, defects are corrected and then the other portions are encapsulated with the second plastic material.

13 Claims, 4 Drawing Sheets

TERMINAL BLOCK AND METHODS OF MAKING

TECHNICAL FIELD

This invention relates to a terminal block and to methods of making same. More particularly, it relates to a protected terminal block which may be tested prior to the completion of its manufacture.

BACKGROUND OF THE INVENTION

Communications service to the home is provided by cables which extend to a local area and then by individual service cables which extend to each home. In loop distribution plant which employs metallic conductors, a distribution cable may extend to a protected terminal block. From the protected terminal block to each of a plurality of homes extends a drop wire, for example. Such a drop wire is well known and is shown, for example, in U.S. Pat. No. 3,935,369, which issued on Jan. 27, 1976 in the names of E. J. George, et al.

Typically, a protected terminal block includes a plurality of terminal posts and a plurality of terminals. Connected electrically to each of the terminals is a protector which is received in an individual well. Each well is associated with the tip or the ring side of a customer's line. The individual drop wires are connected to the terminal posts. A protector in each well is interposed between a customer's drop wire and the distribution cable. Should the cable be struck by lightning, the protector provides a path to ground thereby avoiding an electrical surge in the drop wires to customers' homes.

In a prior art protected terminal block, bushings in which are received the protectors, are soldered to a plated brass strip which is positioned in a plastic shell. A metallic sleeve which is to extend through the block is soldered to the strip. Module pins are turned threadably into the bushings and extended below the bushings. A metallic terminal which includes two depending terminal tangs is pressed onto each pin. Then the terminal tangs and associates ones of the terminal posts which are supported by another plate are connected together electrically by insulated conductors.

One of each conductor of a pair of insulated conductors is connected to a tang of an associated terminal and the other conductor of the pair of insulated conductors is connected to another tang of an associated terminal. The other tang of each terminal is connected electrically by a strap wire to a post of an associated pair of terminal posts. A drop wire for a particular customer's premises is connected to two posts. Because each side of the line to the customer has a protector therealong, the customer is protected from voltage surges and higher than normal currents.

The wells are formed with the pins in place by introducing a potting compound into the shell. After the potting material cures, the pins are removed by turning them out of the wells. All the pins depend from a plate, which also functions to hold all the terminals. As a result, the individual terminals which are connected to a common ground and associated wiring can not be tested until the pins and the plate are removed. This dictates that the testing is not done until after potting. Consequently, if there are any defects, the completed terminal block has to be discarded because repair of a potted block is not justified economically.

In testing, typically a length of cable is prepared and each end thereof is connected to a terminal block of the above-described configuration. Electrical tests are conducted to insure that continuity exists between the terminal blocks. If the test results are acceptable, the cable is served at an intermediate point to provide two cable lengths, each terminated with a terminal block. If the test results are not acceptable, the cable is severed and the terminal blocks are tested individually. A defective block is discarded because of the difficulty in repairing blocks which have already had a potting compound applied to the terminal posts, terminal tangs and wiring.

Another problem which has surfaced is the intrusion of moisture into the wiring portions of the presently used terminal block. A polyester material has been used to pot the wiring portions of the presently used terminal block. As a result of the moisture intrusion, the insulation resistance of the terminal block is not as high as is desired.

What is sought and what seemingly is not available in the marketplace is a terminal block which allows testing prior to completion of its manufacture to avoid having to dispatch a completed block having a wiring defect. Also what is sought is a terminal block having an insulation resistance which is greater than that of presently used blocks. The sought-after terminal block should be one which is easily manufactured, hopefully at less cost than those presently made.

SUMMARY OF THE INVENTION

The foregoing problems of the prior art have been overcome by the terminal block of this invention. A mold block is arranged to hold a plurality of terminal posts and a plurality of U-shaped terminals. Each of the U-shaped terminals includes a base and two depending tangs, each adapted to be connected electrically, one to an incoming cable and one to a terminal post. Each of the terminals is associated with a bushing which is press-fitted into a ground plate which extends the length of the terminal block. Further, the ground plate is exposed to facilitate grounding of the block.

A protector is adapted to be disposed in each bushing which has a well molded thereabout. The protector is threaded into the bushing in a well and has a portion which extends through a bore extending between the bushing and associated aligned terminal. The portion of the protector which extends through the bore engages a portion of the associated terminal. Each bushing extends above a surface of the terminal block to prevent the flow of water into the bushing.

The bushings, the base and portions of the tangs depending from each U-shaped terminal, as well as portions of the terminal posts are encapsulated in a first plastic material, preferably on an Acrylonitrile Butadiene Styrene resin. Wiring connects exposed portions of the terminal tangs with exposed portions of wiring, spade-like portions which are referred to hereinafter as spades and which depend from the posts. A second plastic material encapsulates the remainder of the tangs and wiring spades of the posts as well as the wiring.

In the manufacture of the terminal block, each of a plurality of metallic bushings is pressed into an opening in a metallic ground plate supported in a mold. A plurality of metallic U-shaped terminals are supported in the mold and aligned with associated ones of the bushings such that legs of each U-shaped terminal depend away from the associated bushing and such that the base of each U-shaped terminal is spaced from an associated bushing. After the mold is closed, plastic molding material is introduced. A pin which extends into each bushing from the mold extends into engagement with the associated terminal to prevent any portion of the plastic material from becoming disposed between each bushing and its associated terminal. After the molding of an the Acrylonitrile Butadiene Styrene resin, for example, about portions of the terminals, bushings and terminal posts, the mold is opened and the pins withdrawn. The withdrawal of each pin leaves a bore extending between each bushing and its associated terminal through which is adapted to project a portion of the protector that is to be received in the bushing.

Afterwards, one tang of each terminal is wired to a spade of an associated terminal post and conductors at one end of a length of cable are connected to the other tang of each terminal. The other end of the length of cable also is wired in the same manner to another terminal block. Tests are performed to determine if there is continuity between the two terminal blocks. If there is no continuity, then the wiring is inspected to locate defects and the defects are repaired. If the test results are satisfactory, the length of cable is severed at a location intermediate the two terminal blocks to provide two terminal block assemblies.

Each of the terminal blocks is then potted with a suitable second plastic material. The potting material encapsulates exposed portions of the terminal tangs and terminal posts and associated wiring. A suitable potting material is a polyurethane material. Advantageously, the polyurethane material has excellent waterblocking properties because of its close, complete adherence to surfaces of the wiring and of the terminals and terminal posts. As a result, the insulation resistance of the terminal block assembly is increased by at least 50% over those used in the past.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 3:
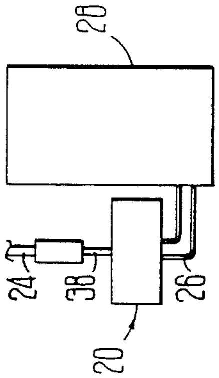
FIG. 3 is a schematic diagram of the distribution of communications service to customers' premises using terminal blocks of this invention.
Figure 1:
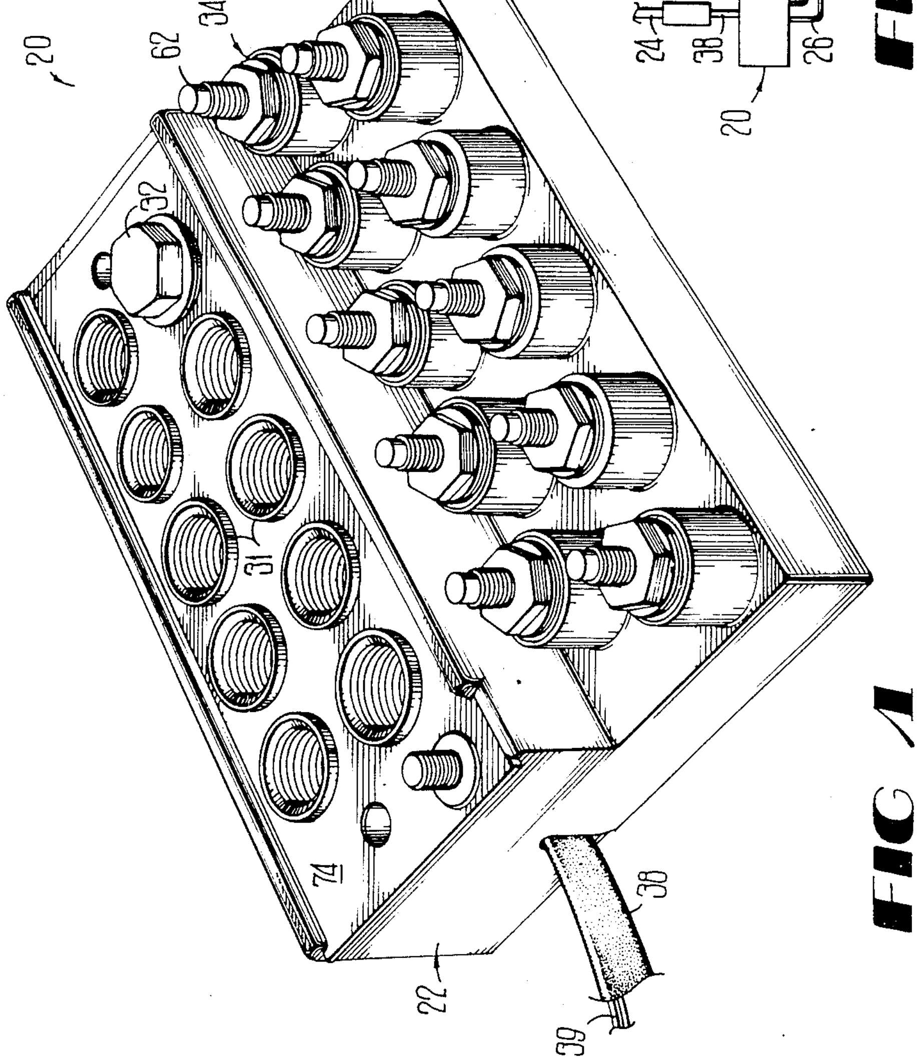
FIG. 1 is a perspective view of a terminal block of this invention.
Figure 2:
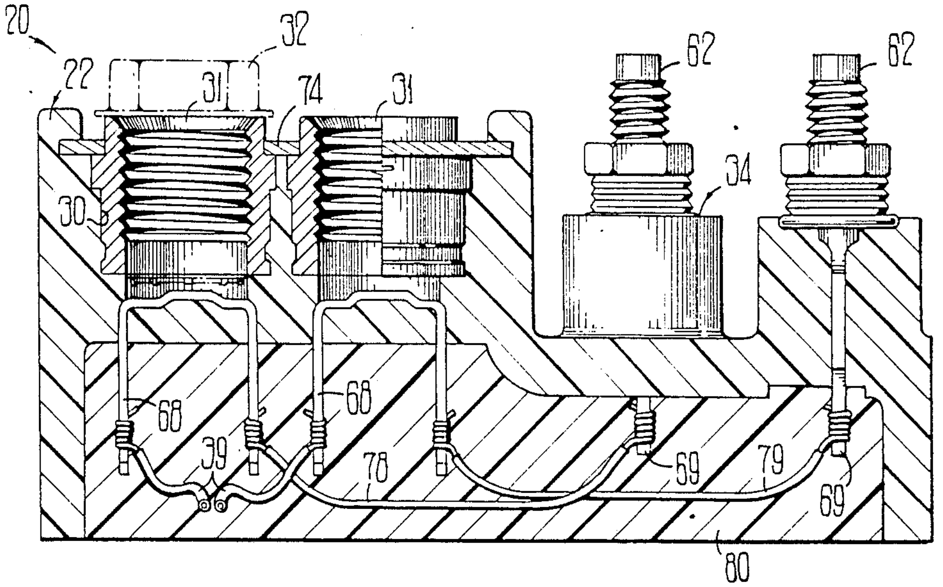
FIG. 2 is an elevational view in section of the terminal block of FIG. 1.

Referring now to FIGS. 1 and 2, there is shown a perspective view of the terminal block of this invention. The terminal block is designated generally by the numeral 20 and includes a plastic housing 22. As can be seen in FIG. 3, the terminal block 20 is used to provide communications service from a distribution cable 24 to a drop wire 26. The drop wire 26 extends from the terminal block to a customer's premises 28.

As can be seen in FIGS. 1 and 2, the terminal block 20 includes a plurality of wells 30—30 in each of which is disposed a metallic bushing 31. Each bushing 31 is adapted to receive a protector 32. Each protector 32 is to provide protection against voltage surges and excess current for a particular customer. Further, each terminal block 20 also includes a plurality of terminal post assemblies 34—34. Two bushings 31—31 and two terminal post assemblies 34—34 are associated with each customer. A terminal and a terminal post assembly are associated with the tip side of the line and a terminal and a terminal post assembly associated with the ring side of the line.

Customarily, the terminal block 20 is sold with a relatively short length of cable 38 extending from the block (see again FIG. 1). The cable includes a plurality of conductor pairs with one conductor 39 (see FIG. 2) of each pair being connected to a protector terminal and the other conductor of each pair being connected to an associated terminal.

Figure 4:
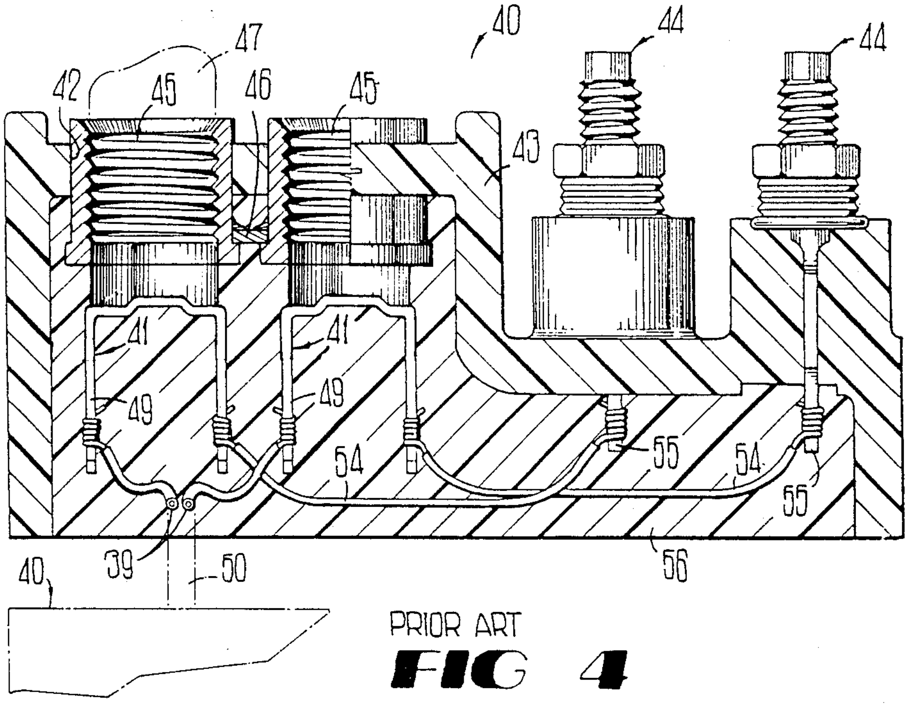
PRIOR ART FIG 4
FIG. 4 is an elevational view in section of a prior art terminal block.

The terminal block 20 may be used in place of a terminal block 40 (see FIG. 4) of the prior art. As can be seen in FIG. 4, the terminal block 40 includes a plurality of wells 42—42, a plurality of aligned, U-shaped terminals 41—41 and a plurality of posts 44—44. Bushings 45—45 soldered to a common plate 46 are inserted into a plastic shell 43. Module pins 47—47 are turned threadably into the bushings and extend below the bushings. Attached to an inner end of each module pin is a metallic terminal 41. The metallic terminal 41 has tangs 49—49 depending therefrom. Likewise, the terminal posts 44—44 are attached to a plate which is disposed across the shell.

The wiring is the same in the prior art terminal block as in the terminal block of this invention. Each end of a short length of cable 50 (see FIG. 4) having a plurality of conductors 39—39 is wired to the tangs 49—49 of the terminals and to the terminal posts of a terminal block. A conductor 39 of each pair is connected to one tang of a terminal and the other to a depending tang of an associated terminal. A strap wire 54 is used to interconnect the other terminal tang of each terminal to a depending spade-like portion or spade 55 of the associated terminal post. A potting composition of matter 56 is used to encapsulate the spades of the posts and the terminals 41—41 with a portion of the composition engaging the tangs (see FIG. 4). Typically, the potting compound is a polyester material.

Inasmuch as all the terminals are connected to a common plate through the module pins 47—47, electrical tests may not be conducted to show continuity between two such terminal blocks which are connected to opposite ends of a length of cable. In order to be able to conduct electrical tests between the two terminal blocks, the metal plate holding the terminal posts is removed. Also, the module pins 47—47 are turned threadably out of the bushings and electrical tests are conducted to determine if there is continuity between the two terminal blocks. If continuity exists, the cable is severed at midspan to provide two terminal blocks each having a short length of cable extending therefrom.

The problem is that if the test results are not acceptable, the cable is severed and both terminal blocks must be tested individually which requires substantial time. A terminal block found to be defective is discarded. If the wiring were exposed, defects could be corrected and the blocks accepted as saleable products. Also, the potting compound which is used, that is, the polyester, does not prevent completely the ingress of moisture. As a result, the insulation resistance of the prior art terminal block is not as high as is desired. However, more desirable potting compounds which have greater affinity for the metallic tangs and spades cannot be used because if they were, the module pins 47—47 could not be removed.

Figure 5:
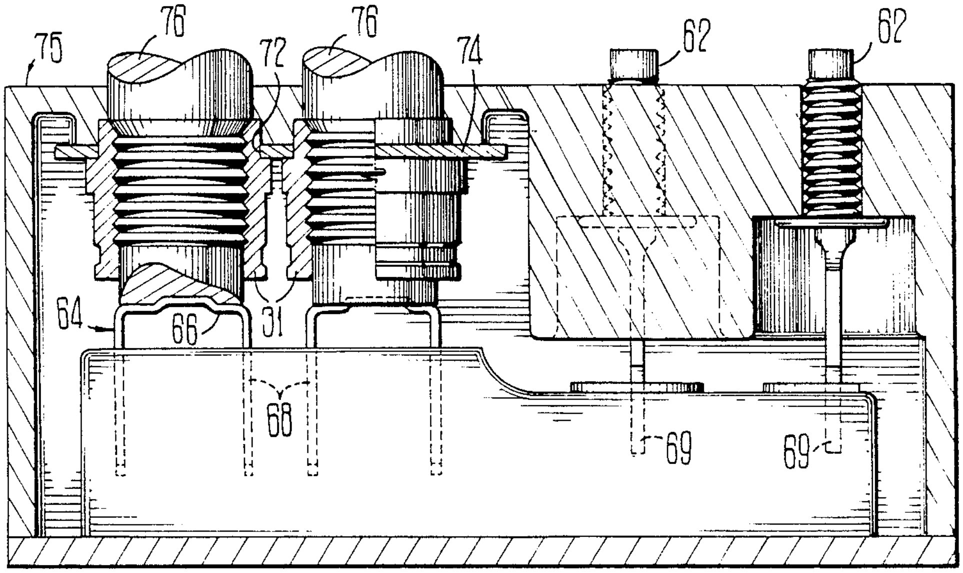
FIG. 5 is an elevational view in section of inserts provided in a mold prior to the introduction of a first plastic material into the mold.

Advantageously, the terminal block of this invention includes the use of two plastic materials. Referring now to FIG. 5, there is shown a partially completed terminal block 20 which includes the plurality of bushings 31—31 and a plurality of terminal posts 62—62. Two bushings 31—31 and two terminal posts 62—62 are associated with a customer's home. Further, as can be seen, each bushing 31 has associated therewith a U-shaped terminal 64 having a base 66 and two depending tangs 68—68. Each post 62 has a spade 69 depending therefrom.

After each of the bushings 31—31 has been pressed into an opening 72 of a ground plate 74, this ground plate is positioned in one half of a mold 75. In the other half of the mold, each of the plurality of U-shaped terminals is positioned with its tangs 68—68 depending through openings and aligned with a bushing. A molding pin 76 extends through the bushing and into engagement with the base 66 of the associated aligned U-shaped terminal 64.

Figure 6:
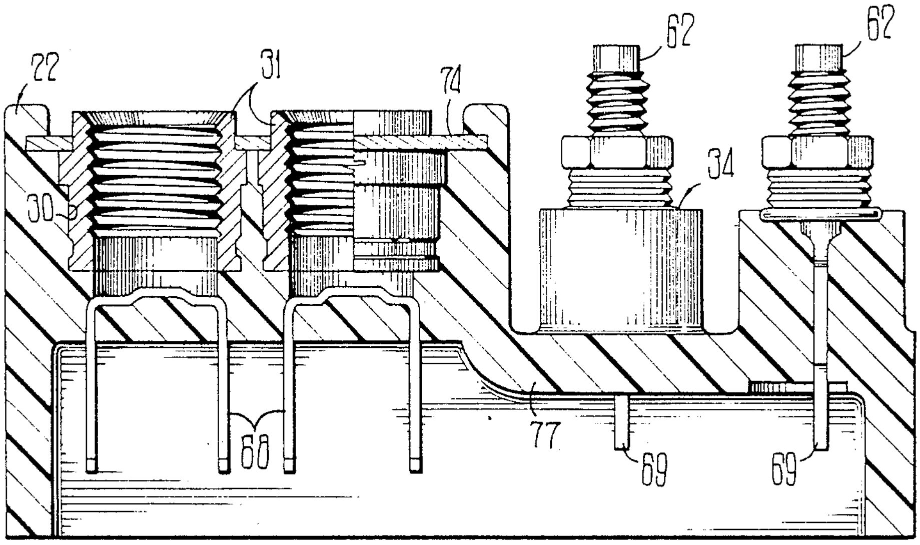
FIG. 6 is an elevational view partially in section of a partially completed terminal block after a first plastic material has been introduced into a mold.

An Acrylonitrile Butadiene Styrene (ABS) resin 77 (see FIG. 6) is introduced into the mold about the bushings and terminals which are inserts in the mold. But the mold 75 is such that the ABS resin 77 is introduced in a manner so as not to encapsulate totally the terminals 64—64 and the tangs 68—68. Also, the ABS resin 77 encapsulates only partially the spades 69—69 of the terminal posts 62—62.

Figure 7:
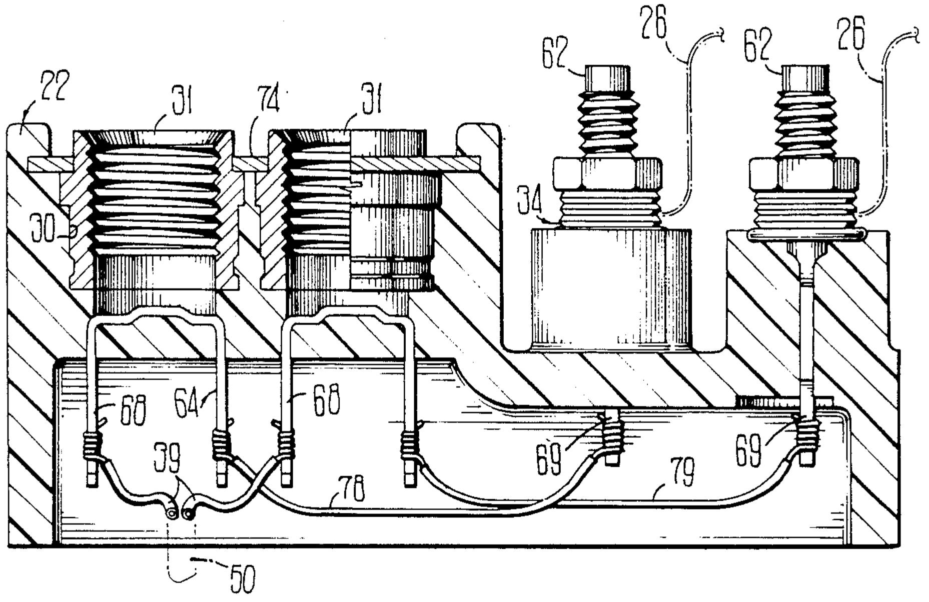
FIG. 7 is an elevational view partially completed terminal block after tangs of terminals and spades of terminal posts have been interconnected.

Afterwards, the terminal tangs 68—68 and the terminal post spades 69—69 are interconnected in accordance with the schematic shown in FIG. 7 and used for the prior art terminal block. One conductor 39 of a pair of conductors of a cable 50 is connected to a tang 68 of a terminal 64 and the other conductor of the pair is connected to a tang 68 of an associated terminal. A conductor 78 interconnects a tang 68 with a spade 69 and another conductor 79 interconnects a tang 68 of the associated terminal 64 to the spade 69 of the other terminal post 62. Such a wiring arrangement is carried out for other conductor pairs of the cable 50 to other pairs of terminals and associated pairs of terminal posts.

After the connecting of the insulated conductors to the terminal tangs 68—68 and to the terminal posts spades 69—69 and after the connection of the conductor pairs of the cable 50 to the terminal tangs of a terminal block at each end of the cable, electrical tests are performed. Continuity between the blocks is checked. If test results are unacceptable, defects can be corrected inasmuch as the wiring is accessible.

Advantageously, the terminal block 20 of this invention allows testing prior to completion of the block. Also, the testing is conducted while the wiring between terminal tangs and terminal post spades is accessible so that if the test results are unacceptable, defects may corrected before the block at each end of a length of cable is completed.

Figure 8:
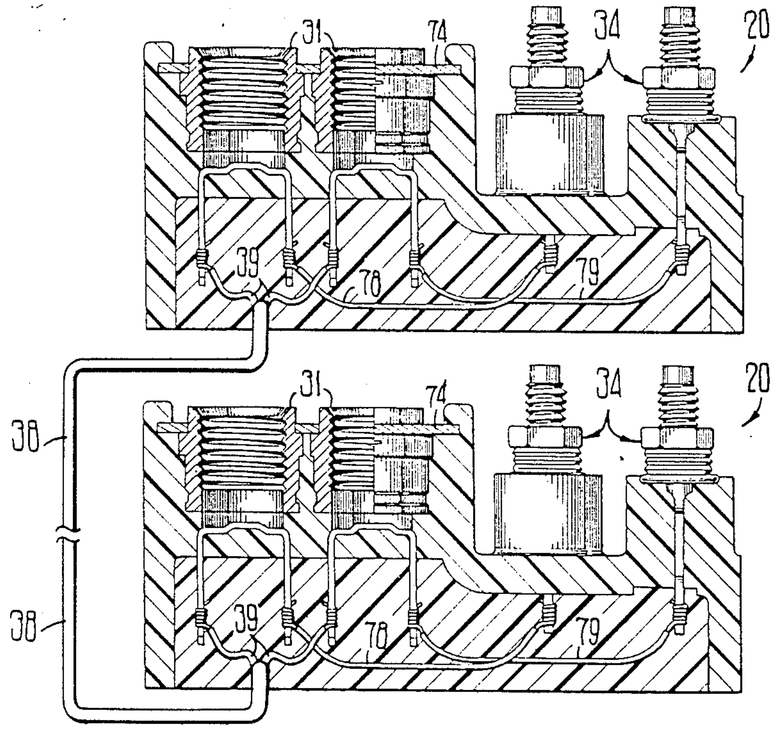
FIG. 8 is an elevational view partially in section of two completed terminal blocks after a second plastic material has been introduced into the mold and after a cable which had interconnected the terminal blocks has been severed.

After each of two terminal blocks 20—20 connected to the ends of a length of cable has been wired as described and tested or tested and repaired, the cable is severed at midspan (see FIG. 8). Two terminal block assemblies 20—20 each having a relatively short length of cable 38 extending therefrom are thereby provided. Afterwards, a second plastic material 80, a polyurethane, is introduced to complete the terminal block (see FIG. 2). The polyurethane 80 completes the encapsulation of the terminal tangs 68—68 and of the spades 69—69 and encapsulates the wiring. Unlike the first plastic material, the ABS resin 77, the polyurethane 80 cures at a temperature of about 110° F. which temperature does not damage the conductor insulation. Further, the polyurethane has great affinity for the metal of the terminal tangs 68—68 and of the spades 69—69. As a result, moisture ingress is decreased and the insulation resistance of the dielectric positions of the block is increased about 50%.

In the prior art terminal block 40, the module pins 47—47 hold the bushings to the plastic shell and the bushings defined the wells. After the bushings and the terminals have been positioned in the shell and the wiring added, a polyester material is introduced into the shell to encapsulate the bushings, terminals and wiring. An ABS resin is not used in the prior art terminal block because the temperature required to flow it into the shell and about the bushings and terminals is so high that the insulation on the conductors used for the internal wiring would melt. On the other hand, polyurethane is not used because it would adhere so strongly to the module pins that the pins could not be removed subsequently.

It is to be understood that the above-described arrangements are simply illustrative of the invention. Other arrangements may be devised by those skilled in the art which will embody the principles of the invention and fall within the spirit and scope thereof.

We claim:

1. A protected terminal block, which comprises:

a plurality of wells;

a bushing which is disposed in each said well;

a protector which is received and secured in each said bushing;

a terminal associated and aligned with each of said bushings and having two tangs depending from a base thereof, said base of said terminal being spaced a predetermined distance from said associated bushing;

a plate through which the bushings extend and said plate providing a common ground for the plurality of bushings;

a plurality of pairs of terminal posts, each post having a conductorconnecting spade and each said pair being associated with two of said terminals, each of said posts being adapted to be connected to an outgoing cable;

a first plastic material which is disposed about innermost portions of said bushings, innermost portions of said tangs of said terminals and innermost portions of said spades of said posts, wherein said first plastic material is disposed about said bushings and associated terminals in a manner to hold each bushing and associated terminal in alignment with each other and to allow each said protector in each said bushing to engage said base of the associated terminal;

conductors which extend between remaining portions of said tangs and remaining portions of said spades of said terminal posts which are not enclosed by said first plastic material and from an incoming cable to said remaining portions of said terminal tangs, with the spade of one post of each pair being connected electrically to one of the tangs of one of said associated terminals, the spade of the other connected to one of the tangs of the other one of said associated terminals, and the other tang of each said terminal being connected to an incoming cable; and a second plastic material which encapsulates said remaining portions of said spades of said terminal posts and said remaining portions of said tangs of said terminals.

2. The terminal block of claim 1, wherein the temperature at which the first plastic material cures is substantially higher than that at which the second plastic material cures.

3. The terminal block of claim 1, wherein said second plastic material is polyurethane and said first plastic material is an ABS resin.

4. The terminal block of claim 1, wherein outermost portions of said bushings project beyond an outer surface of said first plastic material.

5. The terminal block of claim 1, wherein said bushings are mounted in said plate to cause each bushing to extend slightly beyond said plate.

6. A terminal block, which comprises:

a plurality of wells;

a bushing which is disposed in each said well wherein each said bushing is adapted to receive a protector;

a terminal associated and aligned with each of said bushings and having two tangs depending from a base thereof, said base of said terminal being spaced a predetermined distance from said bushing;

a plate through which the bushings extend and said plate provides a common ground for the plurality of bushings;

a plurality of pairs of terminal posts, each having a conductorconnecting spade and each said pair being associated with two of said terminals, each of said posts being adapted to be connected to an outgoing cable;

a first plastic material which is disposed about innermost portions of said bushings, innermost portions of said tangs of said terminals and innermost portions of said spades of said posts, wherein said first plastic material is disposed about said bushings and associated terminals in a manner to hold each bushing and associated terminal in alignment with each other and to allow a protector to engage said base of the associated terminal;

conductors which extend between remaining portions of said tangs and remaining portions of said spades of said terminal posts which are not enclosed by said first plastic material and from an incoming cable to said remaining portions of said terminal tangs, with the spade of one post of each pair being connected electrically to one of the tangs of one of said associated terminals. the spade of the other connected to one of the tangs of the other one of said associated terminals, and the other tang of each said terminal being connected to an incoming cable; and a second plastic material which encapsulates said remaining portions of said spades of said terminal posts and said remaining portions of said tangs of said terminals.

7. A method of making a terminal block, said method comprising the steps of:

supporting a plurality of bushings and terminal posts within a mold, each of said terminal posts having a spade depending therefrom;

positioning a plurality of terminals within another portion of the mold such that each terminal is aligned with and spaced from an associated bushing and such that two depending tangs of each terminal attached to a base thereof extend outside the mold;

inserting a module pin into and through each of said bushings into engagement with the base of the terminal associated with each bushing;

introducing a first plastic material into the mold to provide a housing and to encapsulate portions of the terminal tangs, spades and the bushings and to hold each terminal base spaced from its associated bushing through a gap with the gap being absent of any of the first plastic material;

connecting electrically exposed portions of the spades and terminal tangs with insulated conductors; and introducing a second plastic material to encapsulate the insulated conductors and remaining exposed portions of the terminal tangs and spades of the posts.

8. The method of claim 7, wherein said step of supporting includes the step of causing each of a plurality of bushings to be held in openings in a plate.

9. The method of claim 7, wherein the melt temperature of said second plastic material is substantially less than that of first plastic material.

10. The method of claim 7, which includes the step of connecting conductor pairs of a cable to tangs of the terminals and of connecting the conductor pairs of the cable to tangs of the terminals of another terminal block, the step of introducing the second plastic material also causing portions of the cable conductors which are connected to the terminal tangs of the terminal blocks to be encapsulated in the second material.

11. The method of claim 10,which also includes testing the blocks for continuity between the blocks.

12. The method of claim 11, wherein following the testing of the terminal blocks, the cable is severed approximately midspan to provide two terminal blocks each having a length of cable extending therefrom.

13. The method of claim 7, wherein the second plastic material is polyurethane.

* * * * *